June 10, 1969 P. W. DODGE Re. 26,606

GYMNASTIC APPARATUS

Original Filed March 12, 1963

INVENTOR.
PETER W. DODGE

BY Lucius B. Rice
ATTORNEY

United States Patent Office

Re. 26,606
Reissued June 10, 1969

26,606
GYMNASTIC APPARATUS

Peter William Dodge, 112 W. 75th St., New York, N.Y. 10023

Original No. 3,189,347, dated June 15, 1965, Ser. No. 264,668, Mar. 12, 1963. Application for reissue June 15, 1967, Ser. No. 653,586
Int. Cl. A63b *1/00, 21/06*
U.S. Cl. 272—62 5 Claims

Matter enclosed in heavy brackets [ ] appears in the original patent but forms no part of this reissue specification; matter printed in italics indicates the additions made by reissue.

*ABSTRACT OF THE DISCLOSURE*

*Exercising frame which makes possible the exercise of a maximum number of the muscles of the human body. The frame comprises two angularly attached base members, a back vertical post attached at the joint of the base members, and a pair of front vertical posts attached to an intermediate point of each base member. Above the head of the user, there is a cross member connecting the tops of the front posts, and a brace connecting the top of the back post with the midpoint of the cross member.*

This invention relates to an exercising frame on which a person may exercise. It is an object of this invention to provide a mechanism which can be set up in any suitable place with great ease and which makes possible the exercise of a maximum number of the muscles of the body. The device is in fact the equivalent of most of the apparatus customarily found in a gymnasium, but in a form that may be easily set up or removed at will.

The device comprises a frame on which [the more important] exercising devices may be set up for use, but from which they may easily be removed and put away.

The invention is disclosed in the accompanying drawings in which [FIG. 1 shows the frame work set up to support a horizontal bar at any height convenient for the user. FIG. 2 shows how the frame work may be used with a horizontal bar having weights on its ends that may be raised and manipulated in the usual way.]

[The frame is also adapted to support suitable pins or a cross bar on which a plank may rest, so that the operator, while lying on his back upon said plank, may utilize the apparatus.]

Figure 1:
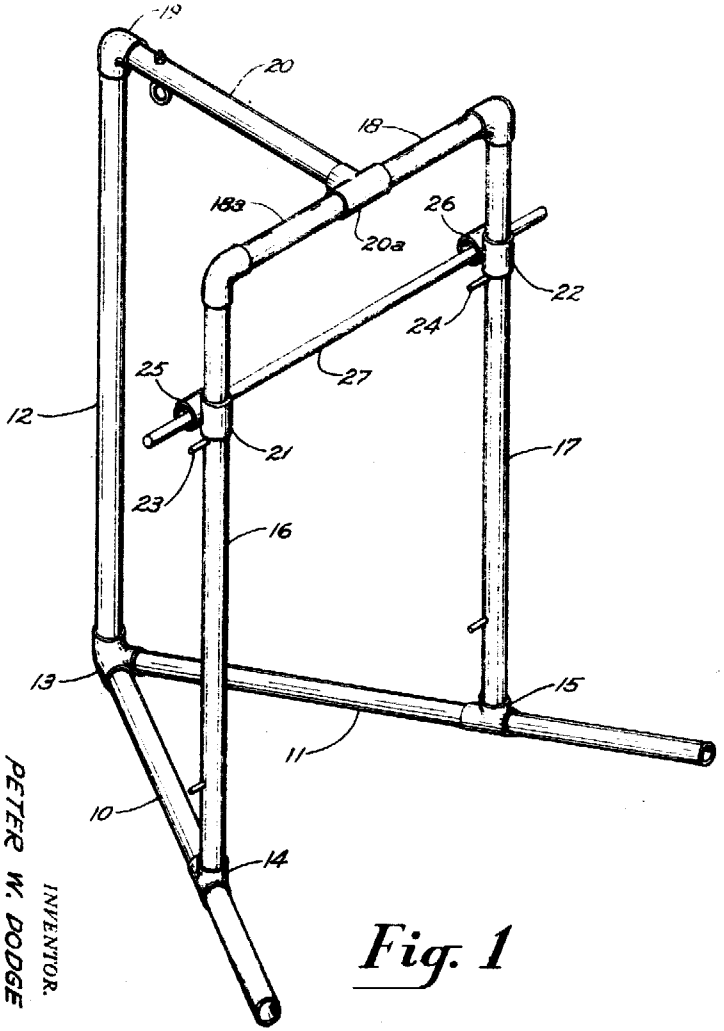
*FIG. 1 is a frontal perspective view of the gymnastic apparatus according to the invention, set up to support an exemplary exercising apparatus, namely a horizontal bar, at any height convenient for the user; and*

As shown in FIG. 1 of the drawings the base of the device comprises two legs 10 and 11 joined together at an angle by a connector 13 which also supports a vertical post 12 of greater height than the user of the device. Each of the legs 10 and 11 has an intermediate connector [14–15], *14, 15* for supporting [a third vertical post] *respective vertical posts* [16–17] *16, 17.* The posts [16–17] are attached at their tops to a cross bar comprising two equal parts 18 and 18a joined together by a T-connector 20a.

The post is connected at its top to a bar 20 by a connector 19 at one end and is connected to [a] *the* connector 20a at the other end.

[This framework as thus described comprises the rigid framework of the existing device.]

The purpose of this framework is to furnish support for the various bars or pulleys or other exercising devices which may be held rigidly in place without the need of being attached to the walls [or] *of* the room.

*The framework constituting the inventive gymnastic apparatus is also adapted to support suitable pins or a cross bar on which a plank may rest, so that the user, while lying on his back upon said plank, may utilize the apparatus.*

[In the device] *When set up* as shown in FIG. 1, slidable sleeves 21, [and] 22 are carried upon the vertical posts [16–17] *16, 17,* which sleeves have also horizontal sockets [25–26] *25, 26* in which an exercising bar 27 may be inserted. The height of the sleeves on the vertical posts is determined by pins [23–24] *23, 24* on which the sleeves [21–22] *21, 22* may rest. Thus the horizontal bar 27 may be supported at any height desired.

Figure 2:
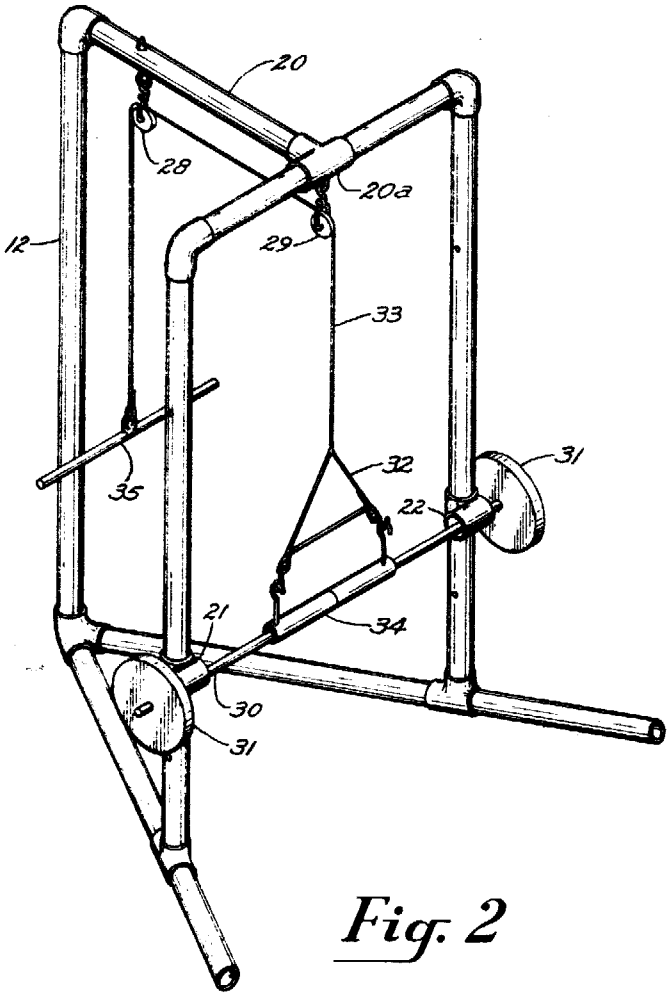
*FIG. 2 is a view similar to that of FIG. 1 but set up for use with another exercising apparatus, namely a horizontal bar having weights on its ends, that may be raised and manipulated as required.*

In the use of the device as shown in FIG. 2 a horizontal bar 30 may be carried by the sockets 25 and 26, on the outside face of posts 16 and 17, the sockets being vertically slidable on the posts.

The horizontal bar 30 has a weight 31 attached to each end beyond the sockets. A sleeve 34 which embraces the middle portion of bar 30 is connected by a harness 32 to a cord 33 which in turn is carried through pulleys 28 and 29 upon the bar 20 to a handle 35, so that by pulling the handle down the weights 31 may be raised.

It will be clear that the framework of the device when assembled as [to] shown may also be used as a support for any other wall type of exerciser desired, without any need to attach it to a wall or to the ceiling. Moreover, the device can be completely disassembled for packing, storage or transportation.

The basic feature of the device will be seen to be the rigid frame which while resting on the floor gives rigid support either overhead or laterally, without the need of disfiguring the floors, walls or ceiling by attaching fixtures.

[What is claimed:] *What I claim is:*

1. [An exerciser] *A gymnastic apparatus* comprising a pair of base bars connected together at one end, said bars being spread to form an open triangle in which a user may stand, the bottom surface of said bars being in a common plane adapted to engage a supporting surface, a pair of lateral vertical posts having their bottom ends [rigidly] attached [respectively] to [a] *respective* mid [point] *points* on said base bars *and* providing a space between them, said vertical posts extending substantially above the head of the user, a first upper bar [comprising] *constituting* a cross bar [rigidly] connecting the tops of said vertical posts, a third vertical post having its bottom end attached to and extending up from the apex of [the] said triangle, *and being* of a height equal to *that of* said lateral posts, *and* a second upper bar [comprising] *constituting* a bracing bar [rigidly] connecting the top of said [apex] *third vertical* post to a mid point on said cross [bars,] *bar* [and exercising apparatus connected to at least one of the said upper bars].

2. [A device] *The gymnastic apparatus* according to claim 1, [wherein said] *further comprising* exercising apparatus [is] mounted on [said bracing bars] *at least one of said posts and said upper bars.*

*3. An exercising frame comprising two base members attached together at an angle of less than 90° and a back vertical post attached to said members at their joint, a pair of front vertical posts, one being attached to an intermediate point of each base member, said posts being straight and of equal lengths, a cross member attached to the tops of said front posts at a height above the head of the used, a brace attaching the top of said back post to the mid point of said cross member, the latter as well*

*as said brace being in a substantially horizontal plane parallel to that of said base members, at least some of the afore-said attachments between said base members and said back post at said joint, said base members and the respective front posts, said tops of the front posts and the respective ends of said cross member, and between said top of the back post as well as said mid point of the cross member and the respective ends of said brace allowing easy set-up and disassembly of the exercising frame for packing, storage and transportation, sleeves slidable on said front posts, and a horizontal bar removably passed through said sleeves, said front posts being provided with a number of bores for receiving respective pins on which said sleeves may rest.*

*4. An exercising frame comprising two base members attached together at an angle of less than 90° and a back vertical post attached to said members at their joint, a pair of front vertical posts, one being attached to an intermediate point of each base member, said posts being straight and of equal lengths, a cross member attached to the tops of said front posts at a height above the head of the user, a brace attaching the top of said back post to the mid point of said cross member, the latter as well as said brace being in a substantially horizontal plane parallel to that of said base members, at least some of the afore-said attachments between said base members and said back post at said joint, said base members and the respective front posts, said tops of the front posts and the respective ends of said cross member, and between said top of the back post as well as said mid point of the cross member and the respective ends of said brace allowing easy set-up and disassembly of the exercising frame for packing, storage and transportation, and at least one pulley attached to the underside of one of said cross member and said brace, whereby a cord having a weight on one end and a handle on the other end may be passed over said pulley, to act as an exerciser on the frame.*

*5. The exercising frame according to claim 4, further comprising sleeves slidable on said front posts, and a horizontal bar attachable to said sleeve, said cord being attached at said one end to said bar so that the latter acts as the weight.*

References Cited

The following references, cited by the Examiner, are of record in the patented file of this patent or the original patent.

UNITED STATES PATENTS

| | | | |
|---|---|---|---|
| 411,701 | 9/1889 | Wilson | 248—97 |
| 1,972,654 | 9/1934 | Heath | 248—13 XR |

FOREIGN PATENTS

| | | |
|---|---|---|
| 456,790 | 3/1928 | Germany. |
| 9,748 | 11/1908 | France. |
| 738,579 | 12/1932 | France. |

RICHARD C. PINKHAM, *Primary Examiner.*

W. R. BROWNE, *Assistant Examiner.*

U.S. Cl. X.R.

248—97; 272—81

UNITED STATES PATENT OFFICE

CERTIFICATE OF CORRECTION

Patent No. Re. 26,606 Dated June 10, 1969

Inventor(s) Peter William Dodge

It is certified that error appears in the above-identified patent and that said Letters Patent are hereby corrected as shown below:

Column 2, line 71 (claim 3, line 8), "used" should read correctly -- user --; and column 4, line 9 (claim 5, line 3), "sleeve" should read correctly -- sleeves --.

The Patentee's correct residential or post-office address is 159 Second Avenue, New York, N.Y. 10003.

SIGNED AND SEALED

AUG 26 1969

(SEAL)

Attest:

Edward M. Fletcher, Jr.

Attesting Officer

WILLIAM E. SCHUYLER, JR.
Commissioner of Patents